(12) United States Patent
Keyser

(10) Patent No.: US 10,830,890 B1
(45) Date of Patent: Nov. 10, 2020

(54) MULTISPECTRAL LADAR USING TEMPORAL DISPERSION

(71) Applicant: Government of the United States, as represented by the Secretary of the Air Force, Wright-Patterson AFB, OH (US)

(72) Inventor: Christian Keyser, Shalimar, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 386 days.

(21) Appl. No.: 15/951,697

(22) Filed: Apr. 12, 2018

(51) Int. Cl.
| | |
|---|---|
| *G01C 3/08* | (2006.01) |
| *G01S 17/89* | (2020.01) |
| *G01J 3/02* | (2006.01) |
| *G01J 3/18* | (2006.01) |
| *G01S 7/481* | (2006.01) |
| *G01S 7/484* | (2006.01) |
| *G01S 7/4863* | (2020.01) |

(52) U.S. Cl.
CPC ............ *G01S 17/89* (2013.01); *G01J 3/0205* (2013.01); *G01J 3/1895* (2013.01); *G01S 7/484* (2013.01); *G01S 7/4811* (2013.01); *G01S 7/4863* (2013.01)

(58) Field of Classification Search
CPC ....... G01S 7/4802; G01S 7/4866; G01S 17/88
USPC ....................................................... 356/4.01
See application file for complete search history.

(56) References Cited

U.S. PATENT DOCUMENTS

| | | |
|---|---|---|
| 6,882,409 B1 | 4/2005 | Evans et al. |
| 7,652,752 B2 | 1/2010 | Fetzer et al. |
| 8,947,659 B1 * | 2/2015 | Baastians ............... G01N 21/65 356/301 |
| 2004/0130702 A1 | 7/2004 | Jupp et al. |
| 2009/0115994 A1 | 5/2009 | Stettner et al. |

* cited by examiner

*Primary Examiner* — Mark Hellner
(74) *Attorney, Agent, or Firm* — AFMCLO/JAZ; David Franklin

(57) ABSTRACT

A LADAR that includes a transmitter and a receiver. The transmitter includes a laser for delivering an original beam pulse. A nonlinear optic receives the original beam pulse and outputs wavelengths as an incident beam pulse. Output optics direct the incident beam pulse onto a target, which reflect from the target as a reflected beam pulse. The receiver includes a dispersive optic for temporally dispersing the wavelengths in the reflected beam pulse, thereby producing a dispersed beam pulse. A single-pixel sensor receives the dispersed beam pulse, and measures and outputs a separate intensity value for each of the wavelengths in the dispersed beam pulse based at least in part on the temporal dispersion of the wavelengths. A processor receives the intensity values from the dispersed beam pulse, correlates the intensity values with the wavelengths, compares the intensity values to known intensity values from the incident beam pulse, produces ratio values for each of the wavelengths, and produces reflectance data in regard to the target from the ratio values.

19 Claims, 6 Drawing Sheets

MULTISPECTRAL LADAR USING TEMPORAL DISPERSION

GOVERNMENT INTEREST

The invention described herein may be manufactured, used, and licensed by or for the Government of the United States for all governmental purposes without the payment of any royalty.

FIELD

This invention relates to the field of electronic sensors. More particularly, this invention relates to electronically sensing the shape of surfaces from a distance.

INTRODUCTION

LADAR (also referred to as lidar and laser radar) is a portmanteau of laser and radar, which is also known as laser detecting and ranging. All LADAR instruments have a transmitter and a receiver, where the transmitter is a laser source used to illuminate an object of interest, referred to as a target, and the receiver includes photodetectors that detect the laser light reflected from the object. One variant of LADAR is called multi-spectral LADAR.

In multi-spectral LADAR, the transmitter creates an incident beam pulse that includes more than one wavelength, where the intensity of each of the wavelengths in the incident beam pulse is known. The incident beam pulse is directed toward the target. When the incident beam pulse is reflected from the target, a reflected beam pulse is created. The intensity of each wavelength in the reflected beam pulse is proportional to the reflectivity of the target at each wavelength. A receiver captures the reflected beam pulse with a lens, which focuses the reflected beam pulse onto an optical element that spatially separates the wavelengths in the reflected beam pulse, such as a grating.

The spatially separated wavelengths impinge upon a collection of sensors, such as a linear detector array, where a given one of the sensors is positioned to receive a given one of the wavelengths in the reflected beam pulse.

In this manner, the intensity of each wavelength for a given reflected beam pulse is measured, and thus the degree of reflectivity of each wavelength can be determined. The reflectivity information and time of flight information, such as might be gathered over a number of incident beam pulses, can be used to determine various properties of the target, such as shape, texture, composition, distance, and relative speed and acceleration.

Although such a system is operable, there is constant pressure to reduce at least one of the complexity, cost, size, weight, and power requirements for such systems.

What is needed, therefore, is a LADAR that reduces issues such as those described above, at least in part.

SUMMARY

The above and other needs are met by a LADAR that includes a transmitter and a receiver. The transmitter includes a laser for delivering an original beam pulse. A nonlinear optic receives the original beam pulse and outputs wavelengths as an incident beam pulse. Output optics direct the incident beam pulse onto a target, which reflect from the target as a reflected beam pulse. The receiver includes a dispersive optic for temporally dispersing the wavelengths in the reflected beam pulse, thereby producing a dispersed beam pulse. A single-pixel sensor receives the dispersed beam pulse, and measures and outputs a separate intensity value for each of the wavelengths in the dispersed beam pulse based at least in part on the temporal dispersion of the wavelengths. A processor receives the intensity values from the dispersed beam pulse, correlates the intensity values with the wavelengths, compares the intensity values to known intensity values from the incident beam pulse, produces ratio values for each of the wavelengths, and produces reflectance data in regard to the target from the ratio values.

In some embodiments, the transmitter includes a filter optic for receiving the incident beam pulse and passing only spectrally separated ones of known, discrete wavelengths in the incident beam pulse to the output optics. In some embodiments, the receiver includes a filter optic for receiving the reflected beam pulse and passing only spectrally separated ones of known, discrete wavelengths in the reflected beam pulse to the dispersive optic. In some embodiments, the nonlinear element includes a gas-filled, hollow-core, photonic-crystal Raman fiber. In some embodiments, the dispersive optic includes an optical fiber that transmits different ones of the wavelengths at different rates. In some embodiments, the dispersive optic includes at least one dichroic mirror that sends different ones of the wavelengths along paths of different lengths. In some embodiments, the dispersive optic includes a fiber circulator that directs the wavelengths along an output fiber having at least two fiber Bragg gratings that reflect at least two of the wavelengths at different positions along the output fiber. In some embodiments, the laser is one of a monochromatic laser, a multispectral laser, and a supercontinuum laser.

According to another aspect of the invention there is described a LADAR having a transmitter and a receiver. The transmitter includes a laser for delivering an original beam pulse. A dispersive optic receives the original beam pulse and outputs an incident beam pulse having temporally dispersed wavelengths. Output optics direct the incident beam pulse onto a target, which reflect from the target as a reflected beam pulse. The receiver includes a single-pixel sensor for receiving the reflected beam pulse and measuring and outputting a separate intensity value for each of the wavelengths in the reflected beam pulse, based at least in part on the temporal dispersion of the wavelengths. A processor receives the intensity values from the reflected beam pulse, correlates the intensity values with the wavelengths, compares the intensity values to known intensity values from the incident beam pulse, produces ratio values for each of the wavelengths, and produces reflectance data in regard to the target from the ratio values.

In some embodiments, the dispersive optic comprises an optical fiber that transmits the wavelengths at different rates. In some embodiments, the dispersive optic comprises at least one dichroic mirror that sends different ones of the wavelengths along paths of different lengths. In some embodiments, the dispersive optic comprises a fiber circulator that directs the wavelengths along an output fiber having at least two fiber Bragg gratings that reflect at least two of the wavelengths at different positions along the output fiber. In some embodiments, the laser is one of a multispectral laser and a supercontinuum laser. In some embodiments, the transmitter further comprises a filter optic for receiving the original beam pulse and passing only spectrally separated ones of known, discrete wavelengths in the original beam pulse to the dispersive optic. In some embodiments, the receiver further comprises a filter optic for receiving the reflected beam pulse and passing only spectrally separated ones of known, discrete wavelengths in the reflected beam pulse to the single-pixel sensor.

According to yet another aspect of the present invention, there is described a LADAR having a transmitter and a receiver. The transmitter includes a laser for delivering an original beam pulse of only a known number of discrete wavelengths. Output optics direct the original beam pulse as an incident beam pulse onto a target, and the incident beam pulse reflects from the target as a reflected beam pulse. The receiver includes a dispersive optic for temporally dispersing the discrete wavelengths in the reflected beam pulse, thereby producing a dispersed beam pulse. A single-pixel sensor receives the dispersed beam pulse and measures and outputs a separate intensity value for each of the discrete wavelengths in the dispersed beam pulse, based at least in part on the temporal dispersion of the wavelengths. A processor receives the intensity values from the dispersed beam pulse.

In some embodiments, the laser comprises one of a monochromatic laser that drives a nonlinear element that produces the discrete wavelengths, a multispectral laser that creates only the discrete wavelengths, and a supercontinuum laser and a filter optic that passes only the discrete wavelengths.

In some embodiments, the dispersive optic comprises an optical fiber that transmits the discrete wavelengths at different rates. In some embodiments, the dispersive optic comprises at least one dichroic mirror that sends different ones of the discrete wavelengths along paths of different lengths. In some embodiments, the dispersive optic comprises a fiber circulator that directs the discrete wavelengths along an output fiber having at least two fiber Bragg gratings that reflect at least two of the discrete wavelengths at different positions along the output fiber.

DRAWINGS

Further advantages of the invention are apparent by reference to the detailed description when considered with the figures, which are not to scale so as to more clearly show the details, wherein like reference numbers indicate like elements throughout the several views, and wherein.

DESCRIPTION

As an overview, various embodiments of the present invention describe a LADAR that directs multiple wavelengths of radiation onto a target, which reflects those wavelengths according to the properties of the target. The wavelengths are temporally dispersed, either before or after being reflected from the target, and just one single-pixel sensor reads the intensities of the temporally dispersed wavelengths in the order that they are received. In this manner, only one single-pixel sensor is needed to separately measure the intensities of the reflected wavelengths.

In various embodiments, the laser that produces the original beam can take different forms. The wavelengths can be produced in different ways. Filters can optionally be used in different places to remove some of the wavelengths. Different structures can be used to temporally disperse the wavelengths, and those structures can be disposed in different locations.

Several different embodiments of this general structure are described below.

Figure 1:
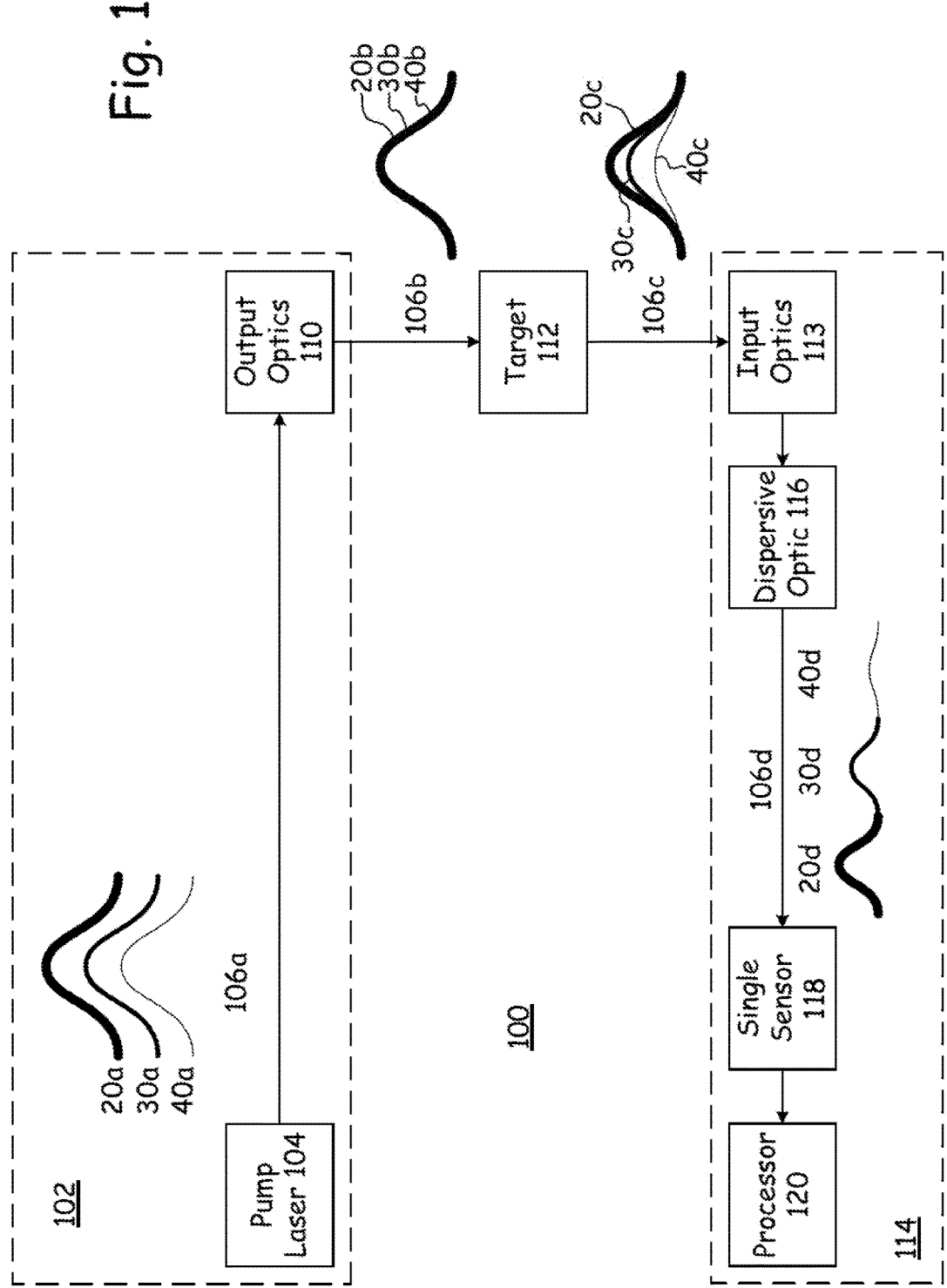
FIG. 1 is a functional block diagram of a LADAR system according to a first embodiment of the present invention.

With reference now to FIG. 1, a LADAR system 100 includes a transmitter 102 with a pump laser 104. In the embodiment of FIG. 1, the pump laser 104 is one of a supercontinuum laser and a multispectral laser, which creates an original beam pulse 106a having, for example, spectral components or wavelengths 20a, 30a, and 40a.

Output optics 110 receive the original beam pulse 106a and direct an incident beam pulse 106b toward a target 112, which scatters the incident beam pulse 106b into a reflected beam pulse 106c. A receiver 114 captures portions of the reflected beam pulse 106c with input optics 113 that pass the reflected beam pulse 106c along to a dispersive optic 116.

The dispersive optic 116 temporally disperses the wavelengths of the reflected beam pulse 106c (spreads different wavelengths out over time), and thereby produces a temporally dispersed beam pulse 106d, which is directed to just one single-pixel sensor 118. The single-pixel sensor 118 measures the intensity of the dispersed beam pulse 116 versus time, which yields reflectivity information in regard to the reflectivity of the target 112 at each of the wavelengths in the reflected beam pulse 106c.

Figure 2:
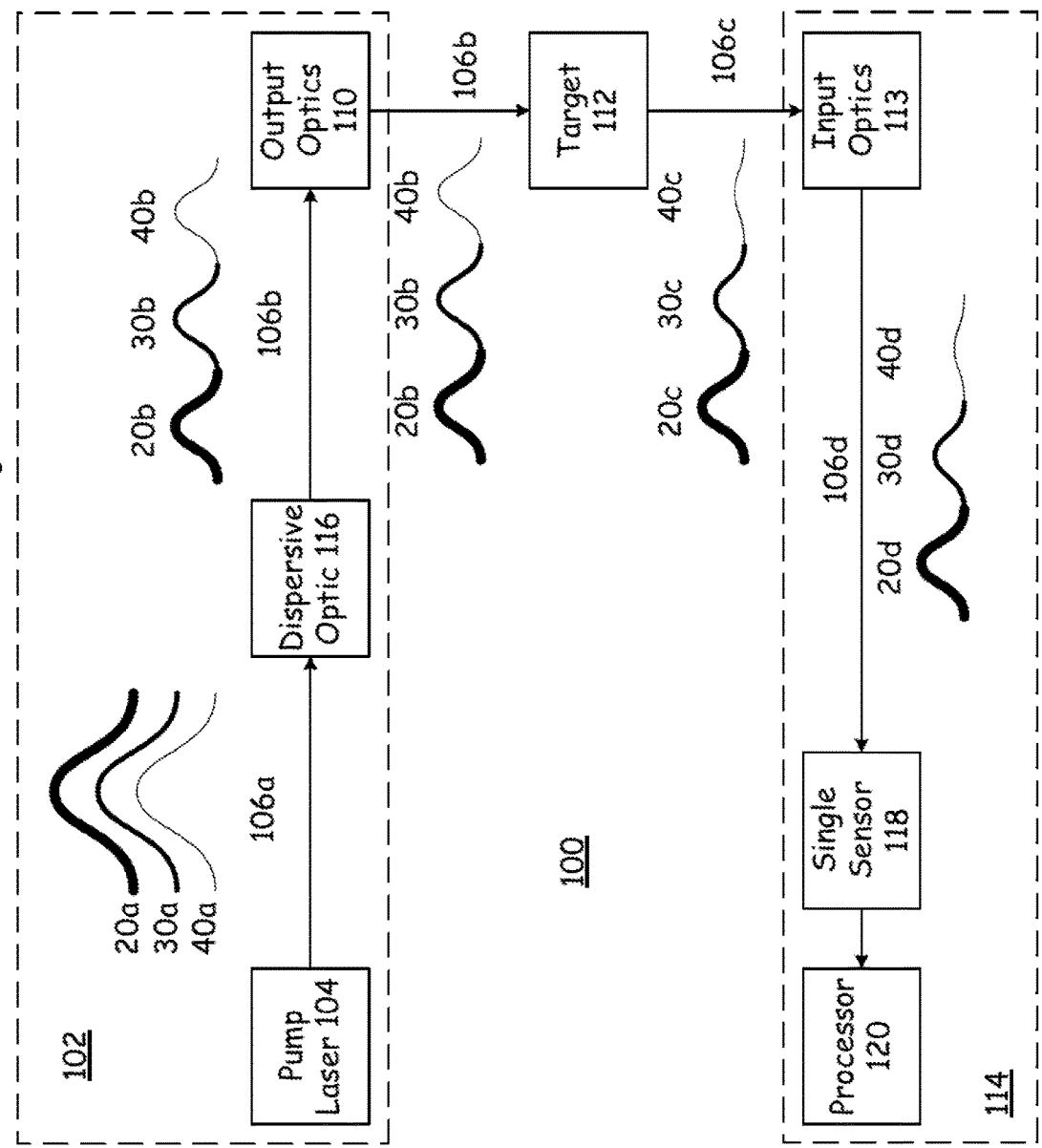
FIG. 2 is a functional block diagram of a LADAR system according to a second embodiment of the present invention.

In the embodiment depicted in FIG. 2, the dispersive optic 116 is disposed in the transmitter 102, between the pump laser 104 and the output optics 110.

Figure 3:
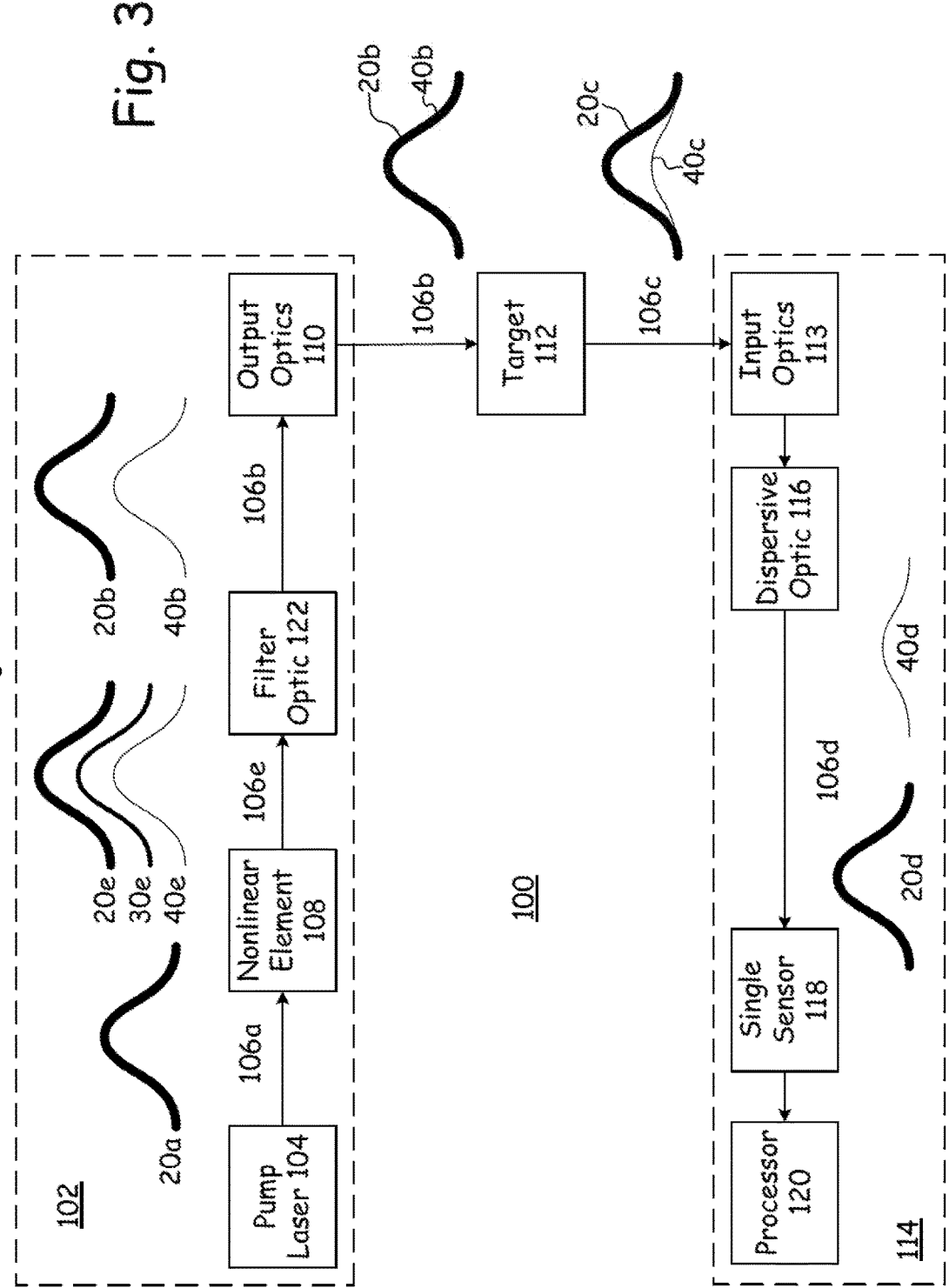
FIG. 3 is a functional block diagram of a LADAR system according to a third embodiment of the present invention.

In the embodiment depicted in FIG. 3, the pump laser 104 is a monochromatic laser that produces a single wavelength (such as 20a) in the original beam 106a, and a nonlinear element 108 produces different wavelengths 20e, 30e, and 40e in the beam 106e, which represent either multispectral components of the beam 106e, or a supercontinuum of wavelengths. In some embodiments, the nonlinear element or optic 108 is at least one of a gas-filled, hollow-core, photonic-crystal Raman fiber, and a solid-core, photonic-crystal Raman fiber.

Figure 4:
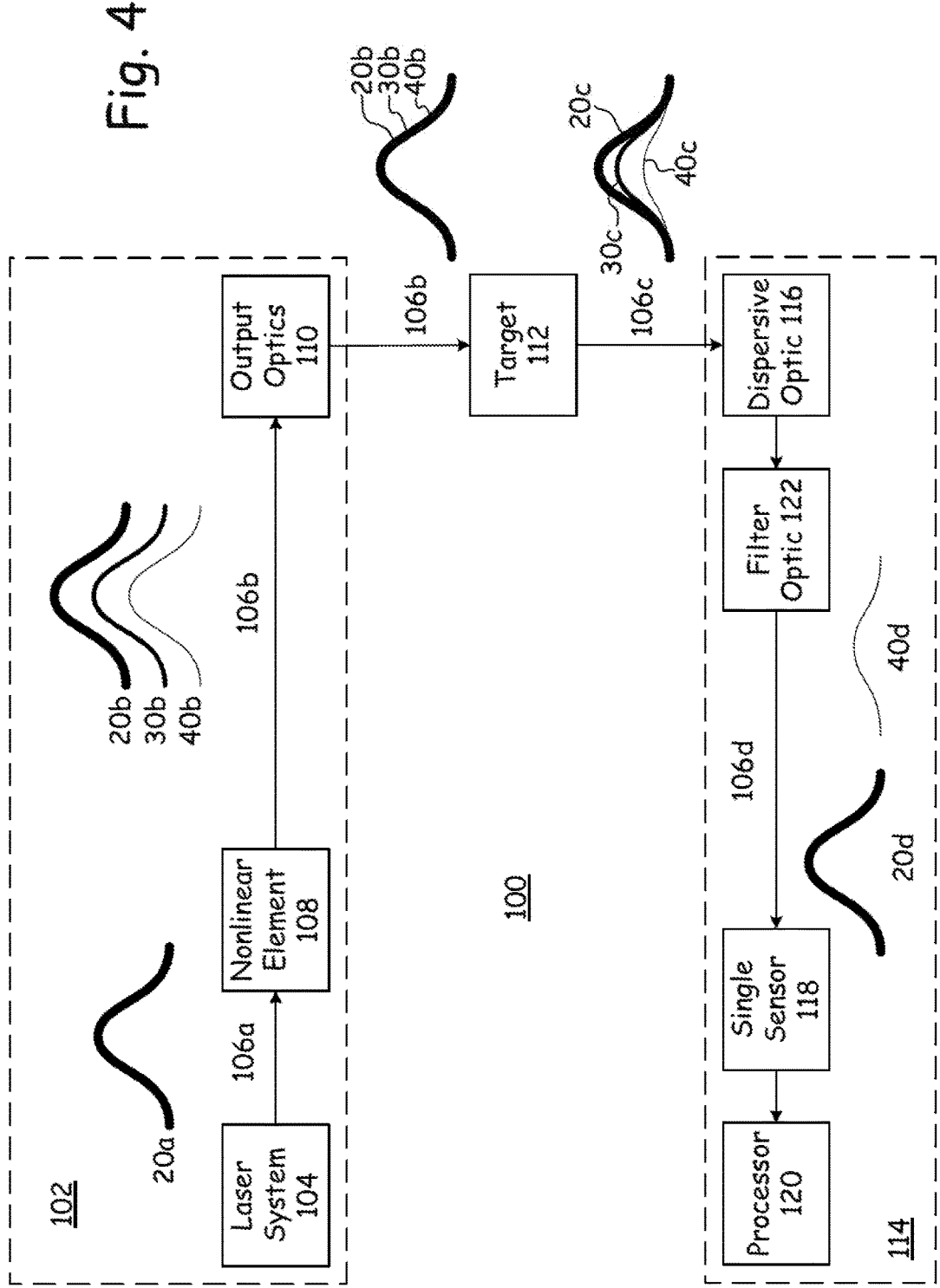
FIG. 4 is a functional block diagram of a LADAR system according to a fourth embodiment of the present invention.

In some embodiments, one or more of the beam pulses 106 is received by a filter optic 122, which filters the beam pulse 106 that it receives so that a lesser number of wavelengths are passed. In the embodiment depicted in FIG. 3, the filter optic 122 is disposed at the output of the nonlinear element 108 and passes only a subset of the received wavelengths. In the embodiment depicted in FIG. 4, the filter optic 122 is disposed after the dispersive optic 116.

One purpose of the filter optic 122 is to create or widen a spectral space between the wavelengths that are present in the beam pulse 106 that is received by the filter optic 122. Thus, it is appreciated that the filter optic 122 can be placed in many more locations than just those as depicted in the figures.

Sometimes the wavelengths 20, 30, and 40 are depicted as spread out vertically. This indicates that the associated beam pulse 106 includes more than one wavelength, the number of which may be more or less than what is depicted in the figures. In this representation, the x-axis generally represents time.

This depiction of the vertical spacing is used for clarity in the description and is not intended to be any kind of literal depiction of how a multispectral beam appears. Similarly, different line weights are used for the different wavelengths 20, 30, and 40 in the figures. Again, this is so that it is easier to see that there are different wavelengths in the beam pulse 106, such as wavelengths 20, 30, and 40.

Sometimes, a beam pulse 106 is depicted with all of the wavelengths 20, 30, and 40 on top of each other. For those beam pulses 106 where the temporal dispersion of the beam pulse 106 has been performed, the wavelengths 20, 30, and 40 are spread out horizontally. These various depictions of the beam pulse 106 are used for greater clarity at the point in the figures at which they are used. In summary, vertical spreading is meant to imply that there is more than one wavelength. Horizontal spreading is meant to imply temporal dispersion of the wavelengths.

When the incident beam 106b impinges upon the target 112, portions of the wavelengths 20, 30, and 40 are absorbed to some varying degree by the target 112, and portions of the wavelengths 20, 30, and 40 are reflected and scattered by the target 112, to produce the reflected beam pulse 106c. Depending upon the properties of the target 112, some wavelengths will be absorbed more than other wavelengths. This is represented in the figures by reducing to some degree the height of a given wavelength 20, 30, or 40, such as in the beam pulse 106c.

For example, in the embodiment depicted in FIG. 1, wavelength 20—depicted as the fattest line—is substantially 100% scattered by the target 112, which means that the target 112 did not absorb a significant portion of the wavelength 20. In actual implementation, it would be somewhat rare that a target 112 would reflect substantially 100% of an incident wavelength, but that example is used in this embodiment so as to more clearly see the distinctions between the reflectivity of the various wavelengths 20, 30, and 40.

Also as depicted, wavelength 30—depicted as the medium weight line—is absorbed by the target 112 to some intermediate degree, and so a lesser portion of the wavelength 30 is scattered by the target 112. Finally, wavelength 40—depicted as the lightest weight line
 is absorbed to a greater degree than the other two wavelengths 20 and 30, and so an even lesser portion of the wavelength 20 is scattered by the target 112.

These variations in the absorption and reflection of the target 112 at different wavelengths is manifested in intensity peaks that are reduced by some different amount for each wavelength, when comparing the reflected beam pulse 106c to the incident beam pulse 106b.

The one single-pixel sensor 118 in the receiver 114, as introduced above, cannot discriminate between one wavelength and another. All of the wavelengths 20c, 30c, and 40c would appear the same to the single-pixel sensor 118, which merely registers changes in intensity over the measured time duration of the reflected beam pulse 106c. Thus, if the reflected beam pulse 106c were to be directed to the single-pixel sensor 118 without any modification, the single-pixel sensor 118 would merely read the cumulative intensity of the reflected beam pulse 106c, without any way to determine the individual and varying contributions of the various component wavelengths 20c, 30c, or 40c.

Therefore, the beam pulse 106 is, at some point prior to the single-pixel sensor 118, received by the dispersive optic 116, which temporally distributes (spreads out in time) the wavelengths 20, 30, and 40 of the beam pulse 106.

The result is that each of the wavelengths 20, 30, and 40 in a dispersed beam pulse 106 are offset one from another, and in some embodiments (such as those in which a filter optic 122 is employed) are separated by some relatively small amount of time. By relatively small, it is meant that the amount of time by which the wavelengths 20, 30, and 40 are separated is not so great as to be confused with the length of time between consecutive pulses of the pump laser 104.

Thus, the one single-pixel sensor 118 is able to detect the difference between consecutive pulses. In other words, the last-received wavelength (such as 40d in the embodiment as depicted) is received significantly closer in time to the preceding discrete wavelength 30d, than it is to the first-received wavelength 20d of the next beam pulse. Thus, the one single-pixel sensor 118 is able to determine temporally dispersed pulses one from another, even though the wavelengths 20, 30, and 40 are temporally dispersed.

The amplitude signals for each wavelength 20d, 30d, and 40d are sent from the single-pixel sensor 118 to the processor 120, which is then able to identify which peak is which by the order in which it is received in a given pulse. Thus, just one single-pixel sensor 118 is able to provide information about the reflectivity of the target 112, because the processor 120 has data that identifies the discrete wavelengths 20, 30, and 40 by the order in which the single-pixel sensor 118 sends the signal information. Thus, the various embodiments of the present invention do not need a linear array of sensor elements, or a two-dimensional array of sensor elements, such as are typically employed with spatially-distributed methods and apparatuses.

The wavelength-specific amplitude values from the dispersed beam pulse 106d are compared to the amplitude of each of the wavelength-specific amplitude values from the incident beam pulse 106b, and the degree of reflectance and absorption of the target 112 can then be calculated, such as by the processor 120, which in some embodiments uses range and calibration information as well. This reflectance or absorption information is then used, such as by the processor 120 or another device, to determine certain properties of the target 112, using methods that are presently understood in the art.

For example, the degree of reflectance by a given wavelength 20, 30, or 40 from the target 112 can be determined by comparing the intensity of the given wavelength 20a, 30a, or 40a in the incident beam 106b—which is either empirically known or can be determined from the operating parameters of the transmitter 102—to the measured amplitude of the associated wavelength 20c, 30c, or 40c as sensed by the single-pixel sensor 118 from the dispersed beam pulse 106d. In some embodiments, these functions are performed by the processor 120.

Dispersive Optic

In one embodiment, the dispersive optic 116 passes lower wavelengths more slowly, and so the highest wavelength in the reflected beam pulse is output first from the chromatically dispersive optic 116, and then the next highest wavelength in the reflected beam pulse 106c is output from the dispersive optic 116, and so forth until all of the discrete wavelengths 20c, 30c, and 40c in the reflected beam pulse 106c have been output one at a time from the dispersive optic 116 in the manner as depicted in dispersed beam pulse 106d.

Thus, each wavelength 20d, 30d, and 40d in a given dispersed beam pulse 106d is eventually received by the lone single-pixel sensor 118 at a different point in time, without any confounding by any of the other wavelengths 20d, 30d, and 40d in the dispersed beam pulse 106d. In this manner, the order in which a given wavelength is received identifies which wavelength is being received. Thus, the intensity of each wavelength 20d, 30d, and 40d in the dispersed beam pulse 106d is independently measured and associated with the proper wavelength. Therefore, the reflectivity at each wavelength 20, 30, and 40 can be directly measured by comparing the known intensity of the wavelength 20b, 30b, and 40b in the incident beam pulse 106b (which is known) with the measured intensity of the wavelength 20d, 30d, and 40d in the dispersed beam pulse 106d.

An example of a dispersive optic 116 that can perform this function is an optical fiber of sufficient length to produce the desired temporal gap between the discrete wavelengths 20c, 30c, and 40c of the reflected beam pulse 106c. Different wavelengths travel through an optical fiber at different speeds, which results in a relative time delay between the different wavelengths. This allows a single beam pulse 106 that is composed of multiple, synchronous wavelengths 20, 30, and 40 to be decomposed into constituent wavelengths that are dispersed in time in a known way.

Figure 5:
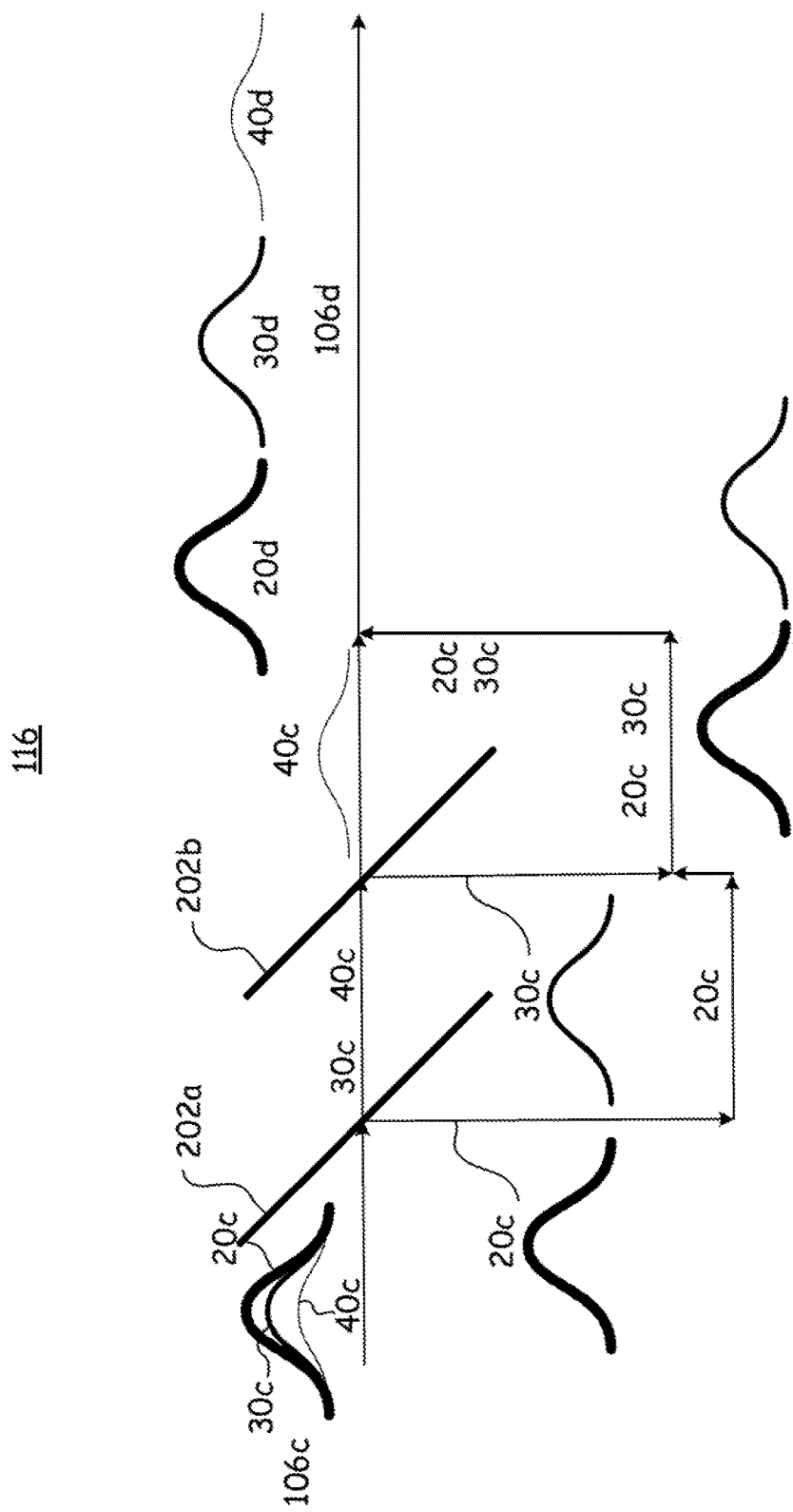
FIG. 5 is a representation of a temporal dispersion module according to a first embodiment of the present invention.

In another embodiment of the dispersive optic 116, as depicted in FIG. 5, a dichroic beam splitter is used to separate the different wavelengths 20c, 30c, and 40c in the reflected beam pulse 106c into different channels. Each channel is directed along a different fiber path, where each fiber path has a different length, one from another. The different fiber paths are then brought back together into a single path. The result is a time delay or gap between the different wavelengths 20c, 30c, and 40c in the reflected beam pulse 106c. Multiple wavelengths are accommodated, for example, with multiple beam splitters, a grating, or a prism.

In the embodiment depicted in FIG. 5, all three discrete wavelengths 20c, 30c, and 40c arrive at the first dichroic mirror 202a, which allows wavelengths 30c and 40c to pass through, but reflects wavelength 20c along a different and longer path. Wavelengths 30c and 40c encounter a second dichroic mirror 202b, which allows wavelength 40c to pass through, but reflects wavelength 30c along a different path that is of intermediate length when compared to the path of 20c and 40c. The three paths converge, but because the paths taken by the wavelength signals 20c, 30c, and 40c were of different length, the wavelengths 20d, 30d, and 40d in the now-combined dispersed beam pulse 106d are temporally dispersed, or in other words, are traveling down the combined path in a serial manner, rather than in a parallel manner.

Figure 6:
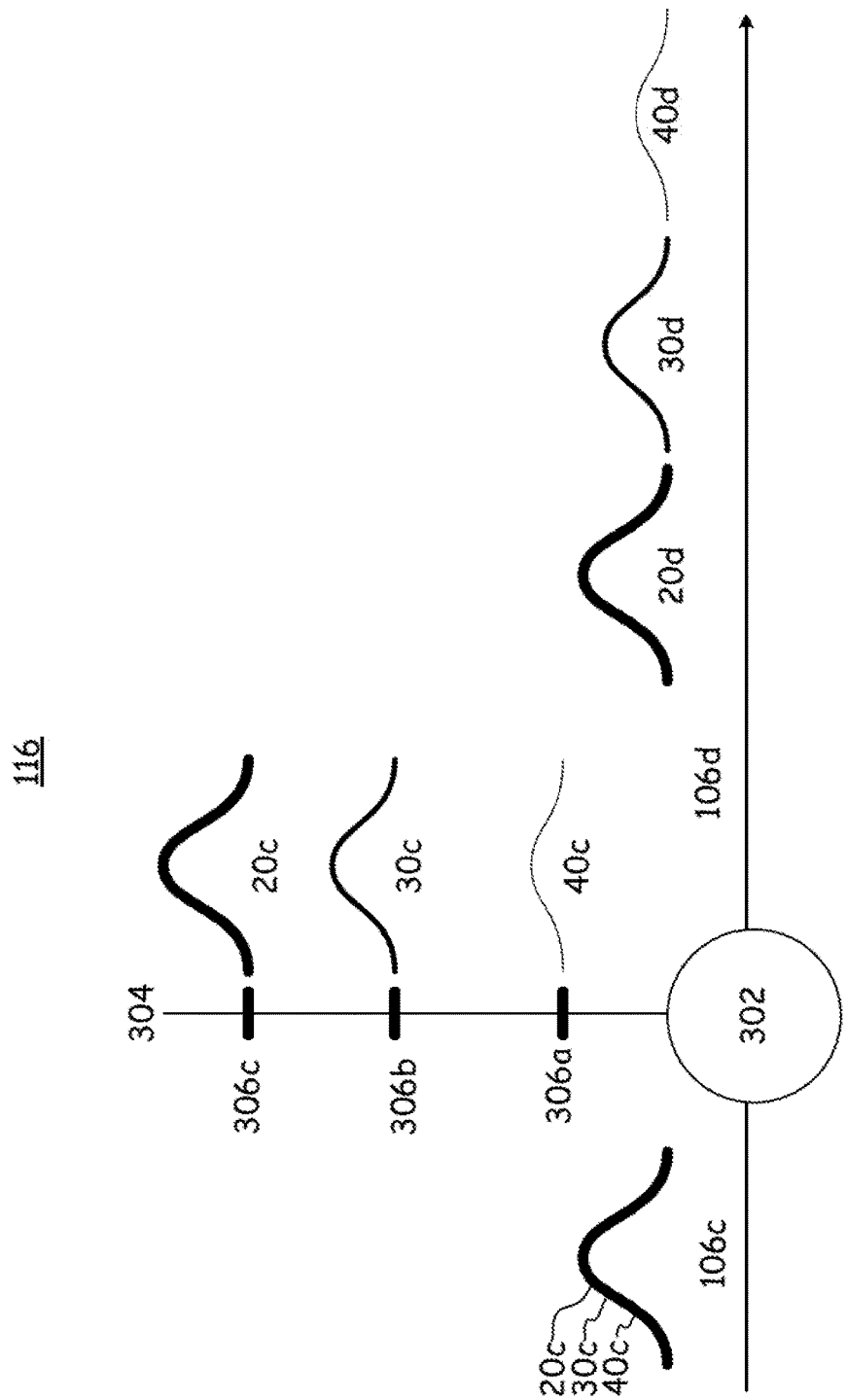
FIG. 6 is a representation of a temporal dispersion module according to a second embodiment of the present invention.

In another embodiment of the dispersive optic 116, as depicted in FIG. 6, the reflected beam pulse 106c is received by a fiber circulator 302 in the receiver. The fiber circulator 302 guides the reflected beam pulse 106c to an output fiber 304 that has multiple fiber Bragg gratings 306 written along its length. Each Bragg grating 306 has a relatively high reflectivity at one of the wavelengths 20c, 30c, and 40c in the reflected beam pulse 106c, and substantially zero reflectivity at the other wavelengths 20c, 30c, and 40c in the reflected beam pulse 106d. This results in each wavelength 20c, 30c, and 40c of the reflected beam pulse 106c being reflected along different lengths of the fiber 304, which thereby introduces a wavelength-dependent delay in that particular reflected wavelength 20c, 30c, or 40c. The circulator 302 guides the reflected discrete wavelengths 20c, 30c, and 40c out a separate channel as the dispersed beam pulse 106d, which leads to the single-pixel sensor 118, where each of the discrete wavelengths 20d, 30d, and 40d are separated in time based upon the position of the Bragg grating in the output fiber 304 that reflected that wavelength 20c, 30c, or 40c.

In those embodiments that use a supercontinuum laser 104, the associated serial continuum in the beam pulse 106 would tend to cause ambiguity in discriminating one wavelength 20, 30, and 40 from another when they are passed to and measured by the single-pixel sensor 118.

This can be remedied by use of a filter optic 122 that blocks certain wavelengths, such as 30, so as to place gaps into the temporal continuum of the beam pulse 106, such as at known wavelengths, which in the example depicted, results in discrete wavelengths 20 and 40 in the beam pulse 106. In one embodiment, the filter optic 122 is a Fabry-Perot filter or a dielectric filter, which blocks multiple wavelength bands.

In some embodiments where there are many more than three wavelengths used, the filter optic 122 filters out wavelengths such that a single discrete wavelength is not immediately temporally abutted by any other single discrete wavelength. In this manner, when the single-pixel sensor 118 detects an input signal, it can be determined by the processor 120 which discrete wavelength that signal belongs to, because the order of the wavelengths is known, and the wavelengths that are passed by the filter optic 122 are known.

In any of these embodiments, the processor 120 is able to determine which of the signals from the single-pixel sensor 118 belongs to which of the discrete wavelengths 20, 30, and 40, because the order of the discrete wavelengths 20, 30, and 40 as received by the single-pixel sensor 118 is known. Further, in some embodiments the processor 120 compares the amplitude of each discrete wavelength signal as measured by the single-pixel sensor 118 to the amplitude of each corresponding wavelength in the incident beam pulse 106b, which is know either through empirical study or from the known operating parameters of the transmitter 102.

These two amplitudes for each discrete wavelength 20, 30, and 40 are compared, such as by taking ratios of the amplitudes as the reflectivity is given by incident to reflected signals one from another and quantifying the difference, to determine how much the target 112 has diminished the amplitude of each discrete wavelength 20, 30, and 40. This diminishing of the amplitude is accounted to the absorption properties of the target 112 at each of the discrete wavelengths 20, 30, and 40. This information is then used in ways that are known in the art to determine certain properties in the regard to the target 112.

Thus, embodiments according to the present invention replace heavier, larger, and more expensive parts, such as gratings and multi-pixel sensor arrays, with a nonlinear element 108, dispersive optics 116, and a single-pixel sensor 118, which are generally lighter, smaller, and less expensive than the parts that they are replacing. This is an important benefit for technologies such as machine vision for missiles and autonomous vehicles.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A LADAR, comprising:
   a laser for delivering a beam pulse that is directed toward and reflected off a target, wherein the laser is one of: (i) a multispectral laser; (ii) a supercontinuum laser; and (iii) a monochromatic laser that directs the beam pulse into a nonlinear element before the beam pulse is reflected off the target, and the nonlinear element produces the wavelengths in the beam pulse;
   a dispersive optic for receiving the beam pulse and temporally dispersing wavelengths within the beam pulse,
   only one single-pixel sensor for receiving the beam pulse after it has been dispersed, and measuring and outputting separate intensity values for the wavelengths in the beam pulse, and
   a processor for receiving the intensity values, correlating the intensity values with the wavelengths, comparing the intensity values to known intensity values for the wavelengths in the beam pulse before it is reflected by the target, and producing reflectance data in regard to the target from the comparison.

2. The LADAR of claim 1, wherein the dispersive optic comprises an optical fiber that transmits the wavelengths at different rates.

3. The LADAR of claim 1, wherein the dispersive optic comprises at least one dichroic mirror that sends different ones of the wavelengths along paths of different lengths.

4. The LADAR of claim 1, wherein the dispersive optic comprises a fiber circulator that directs the wavelengths along an output fiber having at least two fiber Bragg gratings that reflect at least two of the wavelengths at different positions along the output fiber.

5. The LADAR of claim 1, wherein the laser is one of a multispectral laser and a supercontinuum laser.

6. The LADAR of claim 1, wherein the laser is a monochromatic laser that directs the beam pulse into a nonlinear element before the beam pulse is reflected off the target, and the nonlinear element produces the wavelengths in the beam pulse.

7. The LADAR of claim 6, wherein the nonlinear element comprises a gas-filled, hollow-core, photonic-crystal Raman fiber.

8. The LADAR of claim 1, further comprising a filter that passes only a subset of wavelengths in the beam pulse.

9. A LADAR, comprising:
   a laser for delivering a beam pulse that is directed toward and reflected off a target,
   a dispersive optic for receiving the beam pulse and temporally dispersing wavelengths within the beam pulse,
   only one single-pixel sensor for receiving the beam pulse after it has been dispersed, and measuring and outputting separate intensity values for the wavelengths in the beam pulse, and
   a processor for receiving the intensity values, correlating the intensity values with the wavelengths, comparing the intensity values to known intensity values for the wavelengths in the beam pulse before it is reflected by the target, and producing reflectance data in regard to the target from the comparison,
   wherein the laser and the dispersive optic are disposed in a transmitter, and the dispersive optic disperses the wavelengths before the beam pulse is reflected by the target.

10. The LADAR of claim 1, wherein the dispersive optic, the one single-pixel sensor, and the processor are disposed in a receiver, and the dispersive optic disperses the wavelengths after the beam pulse is reflected by the target.

11. A LADAR, comprising:
    a transmitter, comprising,
       a monochromatic laser for delivering an original beam pulse,
       a nonlinear optic for receiving the original beam pulse and outputting wavelengths as an incident beam pulse, and
       output optics for directing the incident beam pulse onto a target, the incident beam pulse thereby reflecting from the target as a reflected beam pulse, and
    a receiver, comprising,
       a dispersive optic for temporally dispersing the wavelengths in the reflected beam pulse, and thereby producing a dispersed beam pulse,
       only one single-pixel sensor for receiving the dispersed beam pulse and measuring and outputting separate intensity values for the wavelengths in the dispersed beam pulse, and
       a processor for receiving the intensity values, correlating the intensity values with the wavelengths, comparing the intensity values to known intensity values for the wavelengths in the incident beam pulse, and producing reflectance data in regard to the target from the comparison.

12. The LADAR of claim 11, wherein the transmitter further comprises a filter optic for receiving the incident beam pulse and passing only spectrally separated ones of known, discrete wavelengths in the incident beam pulse to the output optics.

13. The LADAR of claim 11, wherein the receiver further comprises a filter optic for receiving the reflected beam pulse and passing only spectrally separated ones of known, discrete wavelengths in the reflected beam pulse to the dispersive optic.

14. The LADAR of claim 11, wherein the nonlinear element comprises a gas-filled, hollow-core, photonic-crystal Raman fiber.

15. The LADAR of claim 11, wherein the dispersive optic comprises at least one dichroic mirror that sends different ones of the wavelengths along paths of different lengths.

16. The LADAR of claim 11, wherein the dispersive optic comprises a fiber circulator that directs the wavelengths along an output fiber having at least two fiber Bragg gratings that reflect at least two of the wavelengths at different positions along the output fiber.

17. A LADAR, comprising:
    a transmitter, comprising:
       a laser for delivering an original beam pulse comprised of wavelengths, and output optics for directing the original beam pulse as an incident beam pulse onto a target, the incident beam pulse thereby reflecting from the target as a reflected beam pulse, and
    a receiver, comprising:
       a dispersive optic for temporally dispersing the discrete wavelengths in the reflected beam pulse, and thereby producing a dispersed beam pulse,
       only one single-pixel sensor for receiving the dispersed beam pulse and measuring and outputting separate intensity values for the wavelengths in the dispersed beam pulse, and
       a processor for receiving the intensity values, correlating the intensity values with the wavelengths, comparing the intensity values to known intensity values for the wavelengths in the incident beam pulse, and producing reflectance data in regard to the target from the comparison, wherein the laser comprises one of a multispectral laser, and a supercontinuum laser, and further comprising a filter for reducing the wavelengths to a given number of discrete wavelengths.

18. The LADAR of claim 17, wherein the dispersive optic comprises at least one dichroic mirror that sends different ones of the discrete wavelengths along paths of different lengths.

19. The LADAR of claim 17, wherein the dispersive optic comprises a fiber circulator that directs the discrete wavelengths along an output fiber having at least two fiber Bragg gratings that reflect at least two of the discrete wavelengths at different positions along the output fiber.

* * * * *